(12) United States Patent
Hou et al.

(10) Patent No.: US 10,989,641 B2
(45) Date of Patent: Apr. 27, 2021

(54) RUBBER WEAR RESISTANCE EVALUATION METHOD

(71) Applicant: The Yokohama Rubber Co., LTD., Tokyo (JP)

(72) Inventors: Gang Hou, Hiratsuka (JP); Susumu Hatanaka, Hiratsuka (JP)

(73) Assignee: The Yokohama Rubber Co., LTD.

( * ) Notice: Subject to any disclaimer, the term of this patent is extended or adjusted under 35 U.S.C. 154(b) by 171 days.

(21) Appl. No.: 16/316,027

(22) PCT Filed: Feb. 27, 2017

(86) PCT No.: PCT/JP2017/007440
§ 371 (c)(1),
(2) Date: Jan. 7, 2019

(87) PCT Pub. No.: WO2018/012023
PCT Pub. Date: Jan. 18, 2018

(65) Prior Publication Data
US 2019/0310175 A1    Oct. 10, 2019

(30) Foreign Application Priority Data

Jul. 12, 2016 (JP) ............................. JP2016-137238

(51) Int. Cl.
*G01N 3/56* (2006.01)
*G01N 3/14* (2006.01)

(52) U.S. Cl.
CPC .............. *G01N 3/56* (2013.01); *G01N 3/14* (2013.01)

(58) Field of Classification Search
CPC .......... G01N 3/14; G01N 3/56; G01N 33/445; G01N 19/02; G01K 13/08
USPC ........................................................ 73/7, 9
See application file for complete search history.

(56) References Cited

U.S. PATENT DOCUMENTS 1,711,866 A * 5/1929 Williams ................. G01N 3/56
  73/7
2,929,240 A * 3/1960 Williams ................. G01N 3/56
  73/7
(Continued)

FOREIGN PATENT DOCUMENTS

CN        201004038       1/2008
JP        S48-024784      3/1973
(Continued)

OTHER PUBLICATIONS

Translation of International Preliminary Report on Patentability for PCT/JP2017/007440 dated Nov. 4, 2017 (Year: 2020).*
(Continued)

*Primary Examiner* — David L Singer
(74) *Attorney, Agent, or Firm* — Thorpe North & Western

(57) ABSTRACT

Provided is a rubber wear resistance evaluation method including compressing and bonding a test sample of rubber with additional force to a circular circumferential surface of a rotation body rotated by a drive motor at a predetermined fixed position, holding the test sample in a state where movement of the test sample in a direction opposite to the addition force is always allowed, performing a wear test in which the test sample is worn, and using, at the time of evaluating wear resistance, an index based on at least one item out of two items including power required for driving and rotating the drive motor and a temperature of the test sample during the wear test, in addition to an amount of wear of the test sample.

6 Claims, 9 Drawing Sheets

(56) References Cited

U.S. PATENT DOCUMENTS

| | | | | |
|---|---|---|---|---|
| 2,990,713 | A | * | 7/1961 | Heffelfinger ............ G01N 19/02 73/9 |
| 3,388,584 | A | * | 6/1968 | Van De Velde ......... G01N 3/56 73/7 |
| 3,899,917 | A | * | 8/1975 | Kisbany .................... G01N 3/56 73/8 |
| 4,995,197 | A | * | 2/1991 | Shieh ....................... B24B 5/366 451/1 |
| 5,689,058 | A | * | 11/1997 | Yuan ......................... G01N 3/56 73/9 |
| 2013/0098139 | A1 | * | 4/2013 | Adams, Jr. ............... G01N 3/56 73/7 |
| 2015/0241332 | A1 | * | 8/2015 | Amano .................... G01N 3/08 73/9 |
| 2017/0284915 | A1 | | 10/2017 | Hou |

FOREIGN PATENT DOCUMENTS

| | | | |
|---|---|---|---|
| JP | S61-210926 | | 9/1986 |
| JP | 11326169 A | * | 11/1999 |
| JP | 2001-242056 | | 9/2001 |
| JP | 2004-037286 | | 2/2004 |
| JP | 2008-185475 | | 8/2008 |
| JP | 2013-178163 | | 9/2013 |
| JP | 2016-061597 | | 4/2016 |
| WO | WO-2013187437 A1 | * | 12/2013 ............... G01N 3/08 |
| WO | WO 2016/042998 | | 3/2016 |

OTHER PUBLICATIONS

Machine Translation of CN 201004038 Y (Year: 2020).*
International Search Report for International Application No. PCT/JP2017/007440 dated Apr. 11, 2017, 4 pages, Japan.

* cited by examiner

RUBBER WEAR RESISTANCE EVALUATION METHOD

TECHNICAL FIELD

The present technology relates to a rubber wear resistance evaluation method, and more particularly relates to a rubber wear resistance evaluation method capable of performing evaluation with high reliability.

BACKGROUND ART

As a tester for evaluating rubber wear resistance, a DIN (German Institute for Standardization) abrasion tester and a Williams abrasion tester have been known in the related art. These abrasion testers basically evaluate wear resistance based on an amount of wear of rubber in tests.

As another method of evaluating rubber wear resistance, for example, there has been proposed a method of causing a rubber test piece to be worn by pressing a circumferential surface of a rotating rubber test piece against a circumferential surface of a rotating grindstone to evaluate the tread rubber of a tire (see Japan Unexamined Patent Publication No. 2008-185475). In this proposed method, tests can be carried out under conditions approximate to actual tires by changing torque, which causes the test piece to rotate, in a desired pattern, or the like.

However, the evaluation method in the related art focuses only one evaluation item such as the amount of wear to evaluate the wear resistance, and therefore in some cases, rubber wear resistance cannot be sufficiently evaluated only by the single evaluation item. Accordingly, there is room for improvement to perform evaluation with higher reliability.

SUMMARY

The present technology provides a rubber wear resistance evaluation method capable of performing evaluation with high reliability.

A rubber wear resistance evaluation method of the present technology includes applying additional force oriented to a circular circumferential surface of a rotation body rotated by a drive motor to a test sample of rubber, thereby compressing and bonding the test sample to the circular circumferential surface at a predetermined fixed position, holding the test sample in a state where movement of the test sample in a direction opposite to the additional force is always allowed, performing a wear test in which a contact surface of the test sample with the circular circumferential surface is worn, and evaluating wear resistance of the test sample based on at least one item out of two items including power required for driving and rotating the drive motor during the wear test and a temperature of the test sample, in addition to an amount of wear of the test sample.

According to the present technology, when the aforementioned wear test is carried out to evaluate the wear resistance of the test sample, evaluation indices based on not only the amount of wear of the test sample but also at least one item out of two items including power required for driving and rotating the drive motor during the wear test and the temperature of the test sample during the wear test are used, so that it is possible to perform evaluation with high reliability without overly depending on data on the amount of wear.

DETAILED DESCRIPTION

Hereinafter, a rubber wear resistance evaluation method according to the present technology will be described based on embodiments illustrated in drawings.

Figure 1:
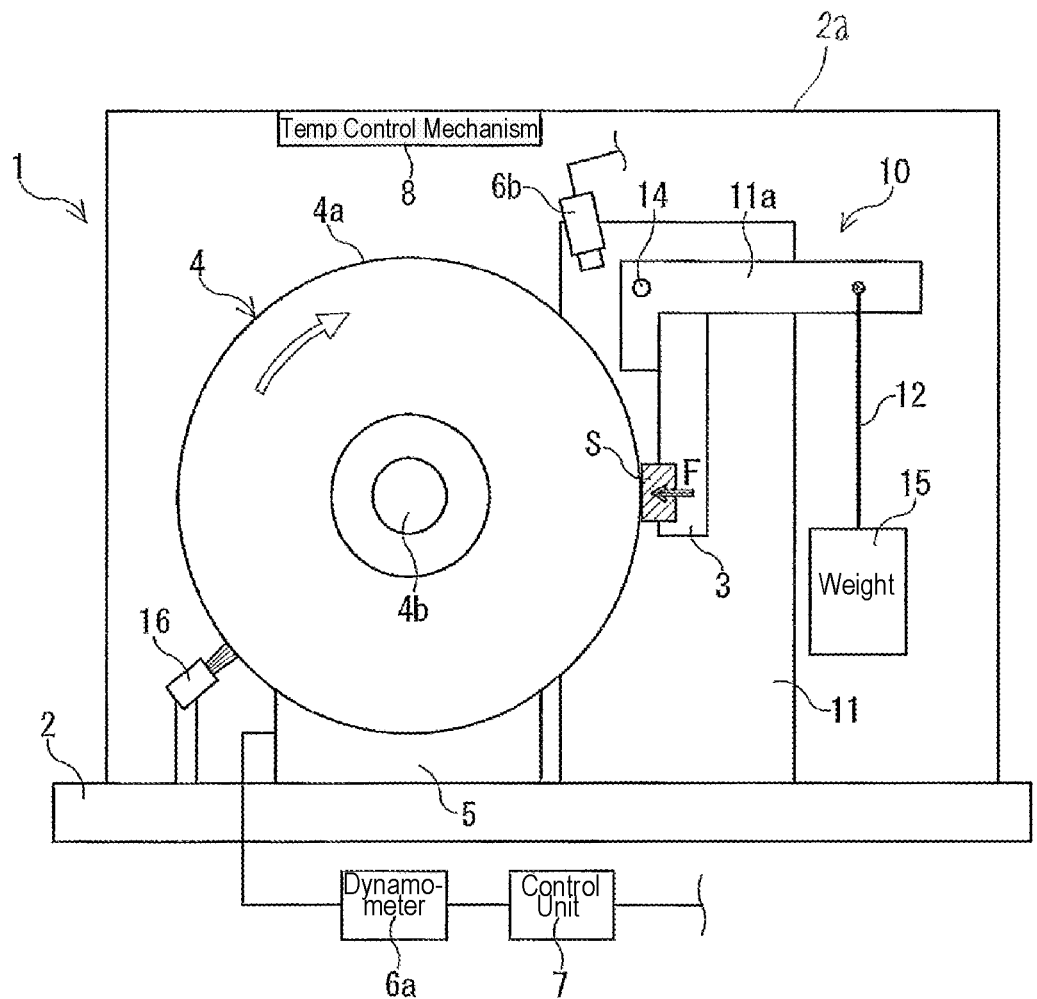
FIG. 1 is an explanatory diagram exemplifying a test device used to evaluate rubber wear resistance in a front view according to the present technology.
Figure 2:
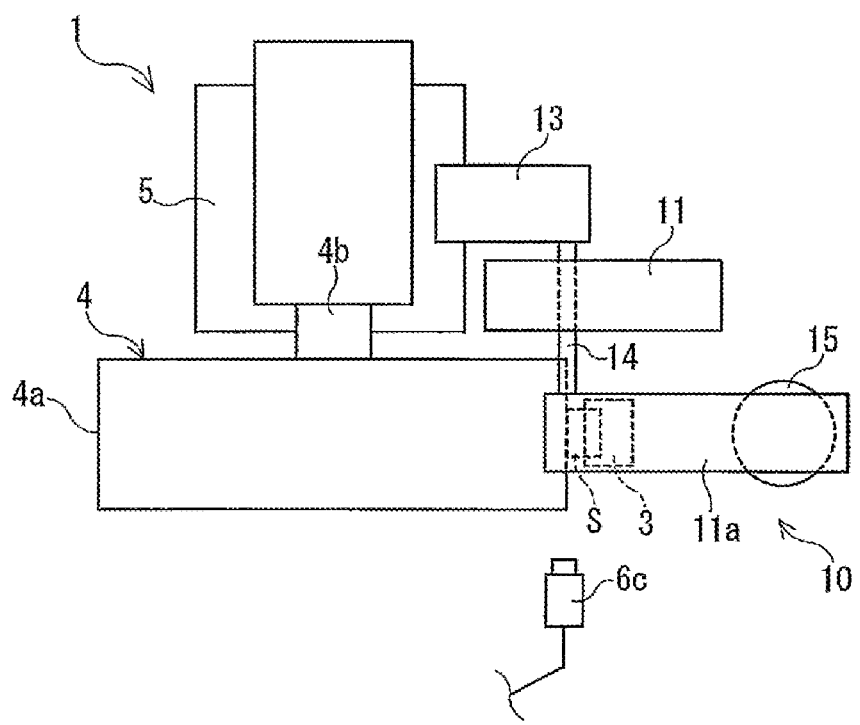
FIG. 2 is an explanatory diagram illustrating part of the test device in FIG. 1 in a plan view.

In the present technology, a testing device 1 illustrated in FIGS. 1 and 2 is used. In the testing device 1, a test sample S of rubber to be tested uses a block-shaped mass or the like, not an annular body. The testing device 1 includes a holding portion 3 for holding the test sample S, a rotation body 4, a drive motor 5 for driving and rotating the rotation body 4, and a compression bonding mechanism 10. Further, the testing device 1 includes a dynamometer 6a, a temperature sensor 6b, a camera 6c, a control unit 7, a temperature control mechanism 8, and a scraper 16, and elements except for the dynamometer 6a and the control unit 7 are covered with a casing 2a installed on a base 2.

The holding portion 3 removably holds the test sample S. The number of holding portions 3 is not limited to one, and a plurality of holding portions 3 may be provided.

The rotation body 4 is a columnar or cylindrical grinding wheel and includes a circular circumferential surface 4a in contact with the test sample S. The circular circumferential surface 4a serves as a grinding surface with respect to the test sample S. The rotation body 4 is rotatable around a rotation shaft 4b provided in the center of the circle thereof.

As for a material or surface roughness of the circular circumferential surface 4a or the like, appropriate specifications are selected based on test conditions. For example, a plurality of rotation bodies 4, each circular circumferential surface 4a of which has a different specification, is prepared, and the rotation bodies 4 are configured to be replaced in accordance with the specification of a necessary circular circumferential surface 4a. Alternatively, the rotation body 4 may be provided such that only the circular circumferential surface 4a is replaceable. In this case, the circular circumferential surface 4a corresponding to a necessary specification is mounted on the core of the rotation body 4.

The drive motor 5 is connected to the control unit 7. A rotational speed of the rotation body 4 (rotation shaft 4b) is controlled to a desired speed by the control unit 7. The outer diameter of the rotation body 4 is known, and thus a peripheral speed V of the circular circumferential surface 4a is calculated in the control unit 7. In this embodiment, the drive motor 5 and the control unit 7 are connected via the dynamometer 6a. The dynamometer 6a measures power W of the drive motor 5 required for driving and rotating the rotation body 4. Measurement data of the dynamometer 6a is input and stored in the control unit 7.

The compression bonding mechanism 10 applies additional force F oriented to the circular circumferential surface 4a to the test sample S held by the holding portion 3. This causes the test sample S held by the holding portion 3 to be compressed and bonded to the circular circumferential surface 4a at a predetermined fixed position with respect to the rotation body 4 being driven and rotated. The compression bonding mechanism 10, further, is configured to allow movement of the test sample S in a direction opposite to the additional force F at all times.

Specifically, the compression bonding mechanism 10 of the present embodiment is constituted of an L-shaped holding arm 11a coupled with the holding portion 3, a wire 12 whose one end is connected to the holding arm 11a, and a weight 15 connected to the other end of the wire 12. A support shaft 14 arranged in parallel to the rotation shaft 4b of the rotation body 4 penetrates a supporting column 11 installed upright on the base 2 and is rotatably supported. The holding arm 11a is fixed to one end portion of the support shaft 14, and a balancer 13 is fixed to the other end portion.

The weight of the weight 15 acts on the holding arm 11a via the wire 12. Thus, by the tension of the wire 12, the holding portion 3 integrated with the holding arm 11a rotates with the test sample S around the support shaft 14. That is, the weight of the weight 15 acts on the test sample S held by the holding portion 3, thereby applying the additional force F oriented to the circular circumferential surface 4a to the test sample S.

The magnitude of the additional force F can be easily changed by varying the weight of the weight 15. Alternatively, the magnitude of the additional force F can be changed by varying a horizontal distance between the supporting shaft 14 and the connection position of the wire 12 with respect to the holding arm 11a, or varying the weight of a balancer 13. Further, the balancer 13 can be installed in such a manner that the additional force F reaches zero in a state where the weight 15 is removed. For example, the weight of the balancer 13 and a distance from the supporting shaft 14 are selected in such a manner that the empty weight of the compression bonding mechanism 10 in a state where the weight 15 is removed is cancelled out, thereby causing the additional force F to reach zero. The weight of weight 15 and the additional force F can be equated by installing the balancer 13 in such a manner that the additional force F reaches zero in a state where the weight 15 is removed, and by equating a distance between the test sample S and the supporting shaft 14 with a distance between the supporting shaft 14 and the connection position of the wire 12 with respect to the holding arm 11a.

The surface of the test sample S opposite to the circular circumferential surface 4a is brought into a state of being pressed against and in contact with the circular circumferential surface 4a by the additional force F (specified load) having a constant magnitude all the time. It is preferable that the direction of the additional force F is set to a direction oriented to the rotation center (rotation shaft 4b) of the rotation body 4. With this direction, the test sample S can be stably pressed and in contact with the circular circumferential surface 4a by the additional force F. To facilitate the smooth rotation of the holding arm 11a around the support shaft 14, for example, the support shaft 14 may be supported by the supporting column 11 via a bearing.

Herein, the test sample S is simply pressed against the circular circumferential surface 4a based on the weight of the weight 15. Thus, the holding arm 11a rotates around the support shaft 14, which makes it possible for the test sample S to move in the direction opposite to the additional force F all the time. Along with this, when force in the direction opposite to the additional force F acts on the test sample S, the test sample S can move in the direction in which the test sample S separates from the circular circumferential surface 4a.

The compression bonding mechanism 10 is not limited to the configuration illustrated in the embodiment. As long as the compression bonding mechanism 10 has the configuration in which the additional force F oriented to the circular circumferential surface 4a is applied to the test sample S held by the holding portion 3, thereby being compressed and bonded to the circular circumferential surface 4a at a predetermined fixed position, and the movement of the test sample S in the direction opposite to the additional force F is always allowed, various configurations can be employed.

In this embodiment, the test sample S is in contact with the circular circumferential surface 4a at the same position as that of the rotation shaft 4b on the horizontal level, but the position (position in the circumferential direction of the rotation body 4) at which the test sample S is in contact with the circular circumferential surface 4a is not limited to this. For example, a configuration in which the test sample S is in contact with the circular circumferential surface 4a at a position above the rotation shaft 4b may be applied. Thus, a predetermined fixed position at which the test sample S is compressed and bonded to the circular circumferential surface 4a can be set as appropriate.

The temperature sensor 6b detects a temperature T of the test sample S. The detection data of the temperature sensor 6b is input and stored in the control unit 7. The camera 6c takes a photograph of the movement of the test sample S, and the photographed video data is input and stored in the control unit 7.

The temperature control mechanism 8 adjusts the test sample S to a predetermined temperature. In this embodiment, many members (components) except for the dynamometer 6a and the control unit 7 are covered with the casing 2a installed on the base 2. The temperature control mechanism 8 is provided on the upper surface of the casing 2a. The internal temperature of the casing 2a is adjusted to a predetermined temperature by the temperature control mechanism 8, which indirectly adjusts the temperature T of the test sample S.

The temperature control mechanism 8 is controlled by the control unit 7. A heater that directly heats the test sample S or a cooler that directly cools the test sample S can be employed as the temperature control mechanism 8.

The scraper 16, for example, has a brush shape and is in contact with the circular circumferential surface 4a. The rotation of the rotation body 4 causes the scraper 16 to remove wear debris or the like of the test sample S adhered to the circular circumferential surface 4a. Consequently, constant surface roughness on the circular circumferential surface 4a is easily maintained all the time, which is advantageous to determine a wear state of rubber of the test sample S with accuracy.

Hereinafter, an evaluation method using the testing device 1 according to the present technology will be described.

As illustrated in FIGS. 1 and 2, the test sample S is held by the holding portion 3. A desired specification is set for the circular circumferential surface 4a. For example, when an upper cover rubber 17a of a conveyor belt as the test sample S is evaluated, the circular circumferential surface 4a having surface roughness in conformity with the shape of a conveyance object 20 conveyed on the conveyer belt, or the like is used. In addition, the weight of the weight 15 is set in such a manner that a desired additional force F is applied to the test sample S, and the rotation body 4 is rotated at the desired speed having been set. Further, the temperature control mechanism 8 is activated, thereby setting the test sample to a desired temperature. The settings, for example, are performed in accordance with conditions under which the rubber of the test sample S is practically used.

In the wear testing device 1 with the settings described above, the additional force F oriented to the circular circumferential surface 4a of the rotation body 4 rotating is applied to the test sample S as illustrated in FIG. 1. The test sample S is pressed by the additional force F at a predetermined fixed position with respect to the rotation body 4 and comes in contact with the circular circumferential surface 4a. The rotation body 4 rotates, which brings the test sample S and the circular circumferential surface 4a into a state of sliding, and thus the contact surface with the circular circumferential surface 4a of the test sample S is gradually worn.

Typically, when a target object and a rubber relatively move in a state of being in contact with each other, and the target object slides with respect to the rubber, both are not uniformly in contact with each other, and a so-called stick-slip phenomenon occurs. In the stick-slip phenomenon, a process (sticking process) in which the rubber counteracts force (frictional force) received from the target object and is elastically deformed, and a process (slippage process) in which the rubber cannot counteract the frictional force and elastic deformation is released, and the rubber is slid to the target object, are repeated.

Figure 3:
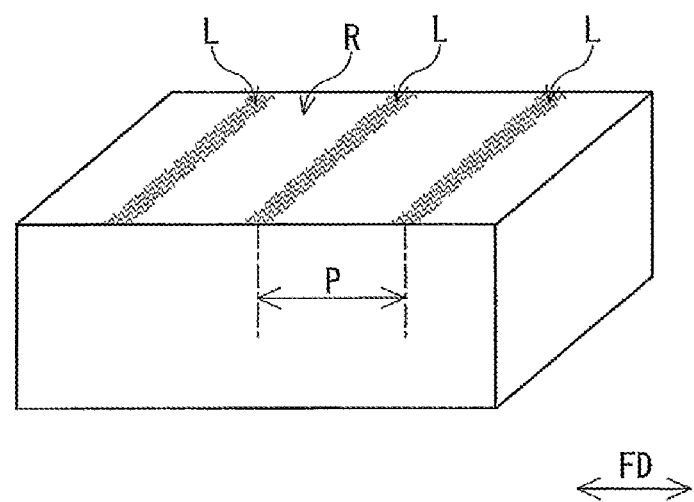
FIG. 3 is an explanatory diagram illustrating a stick-slip phenomenon.

The sticking process and the slippage process are repeated, and thus, as illustrated in FIG. 3, wear streaks L with predetermined pitches P in a sliding direction FD are formed on the surface of the rubber R on which the target object slides. The pitches P correspond to the slippage process, and the wear streaks L correspond to the sticking process.

In the testing device 1, the test sample S is always allowed to move in the direction opposite to the additional force F, and thus the sticking process and the slippage process can be repeated in the test sample S sliding on the circular circumferential surface 4a. That is, it is possible to reproduce the stick-slip phenomenon. Accordingly, a wear state of rubber in accordance with practical use can be determined with higher accuracy. For example, the wear state of the upper cover rubber of the conveyor belt can be determined with accuracy.

In the evaluation method of the present technology, as described above, the wear test of the test sample S is carried out for a predetermined time, and the rubber wear resistance of the test sample S is evaluated based on the amount of wear D of the test sample S. Further, the wear resistance of the test sample S is evaluated based on at least one item out of two items including the power W required for driving and rotating the drive motor 5 during the wear test and the temperature T of the test sample S during the wear test.

Figure 4:
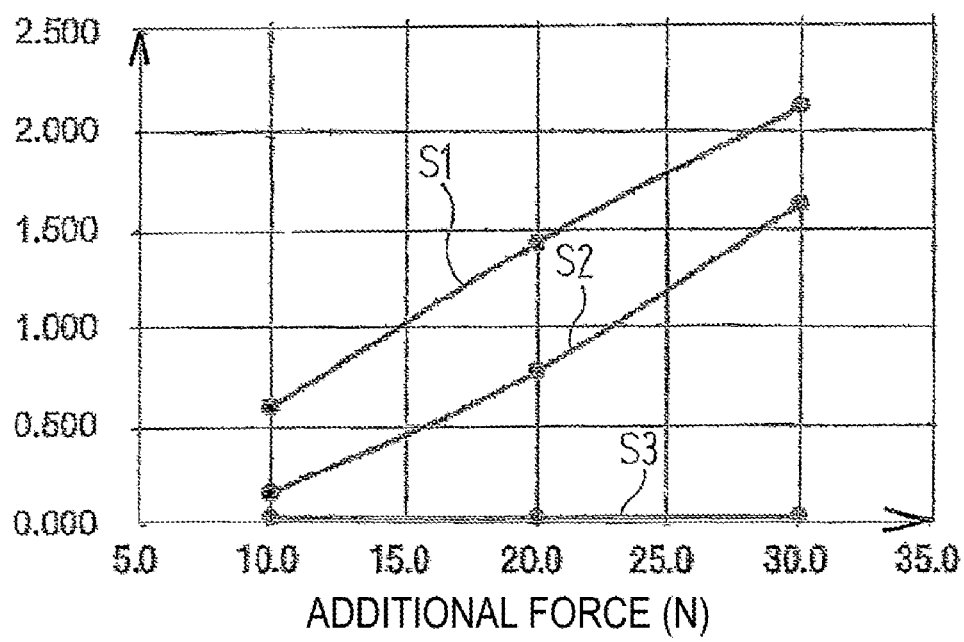
FIG. 4 is a graph illustrating a relation of an amount of wear of a test sample and additional force in a case where a peripheral speed of a circular circumferential surface of a rotation body is a certain predetermined speed.
Figure 5:
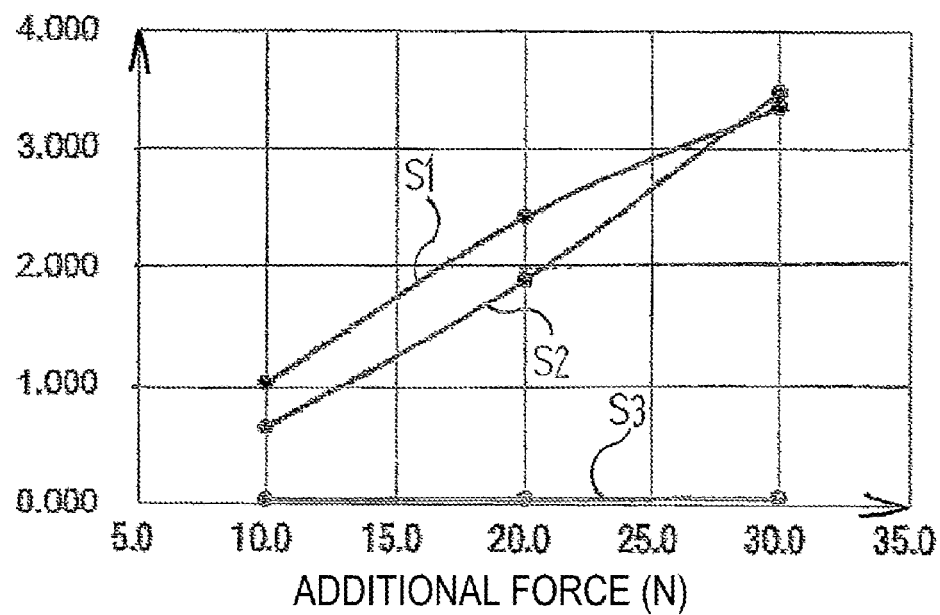
FIG. 5 is a graph illustrating a relation of an amount of wear and additional force in a case where a peripheral speed of a circular circumferential surface is three times that of FIG. 3.

As the evaluation based on the amount of wear D, for example, the wear test is carried out by varying the additional force F and the peripheral speed V, and the amount of wear D is measured. This obtains data illustrated in FIGS. 4 and 5. FIG. 4 illustrates a relation of the amount of wear D and the additional force F for a plurality of test samples S (S1, S2, S3), each being a different type of rubber, in a case where a peripheral speed V is a certain predetermined speed. FIG. 5 illustrates a relation of the amount of wear D and the additional force F in a case where the wear test is carried out with a difference in that the peripheral speed V is three times that in the case of FIG. 4.

A test sample S1 is rubber of NR (natural rubber) enriched formulation, S2 is rubber of SBR (styrene butadiene rubber) enriched formulation, and S3 is rubber of BR (butadiene rubber) enriched formulation. In FIGS. 4 and 5, the amount of wear D is indicated by an index divided by a certain reference value.

It is evident from data in FIGS. 4 and 5 that, as for any test sample S, when the peripheral speed V increases, the amount of wear D increases. In addition, the inclination of the data is different, depending on the test sample S, and thus it is evident that a degree of influence on the additional force F and the peripheral speed V with respect to the amount of wear D is different, depending on the type of rubber.

Figure 6:
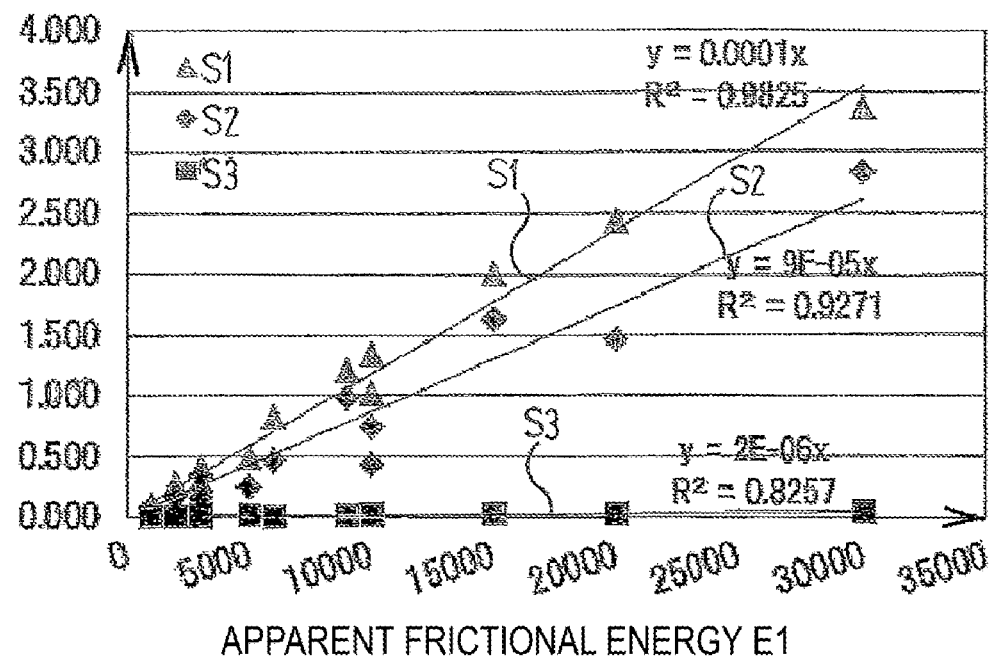
FIG. 6 is a graph illustrating a relation of an amount of wear and apparent frictional energy.

Apparent frictional energy E1 in a case where the test sample S is pressed by the additional force F to the circular circumferential surface 4a having the peripheral speed V can be calculated as a result of "additional force F×peripheral speed V" (E1=F×V). Thus, for example, the apparent frictional energy E1 of respective test samples S is calculated by the control unit 7, thereby acquiring a relation of the apparent frictional energy E1 and the amount of wear D illustrated in FIG. 6. Based on the data in FIG. 6, for each type of rubber, a relation between the apparent frictional energy E1 and the amount of wear D can be determined.

As an evaluation based on the power W during the wear test, for example, frictional force Ff with respect to the circular circumferential surface 4a of the test sample S is calculated based on the power W detected by the dynamometer 6a. Then, wear resistance is evaluated using the magnitude of the calculated frictional force Ff.

Specifically, energy required for driving and rotating the rotation body 4 at a predetermined speed is compared in a case where the test sample S is in contact with the circular circumferential surface 4a of the rotation body 4 and in a case where the test sample S is not in contact with the circular circumferential surface 4a of the rotation body 4, and a difference in energy between both cases can be calculated as frictional energy E2 generated by the friction between the test sample S and the circular circumferential surface 4a. It is conceivable that the frictional energy E2 per unit time is "E2=frictional force Ff×peripheral speed V", which leads to "frictional force Ff=E2/peripheral speed V". Thus, the kinetic friction coefficient μ of the test sample S can be calculated as "μ=frictional force Ff/additional force F".

Figure 7:
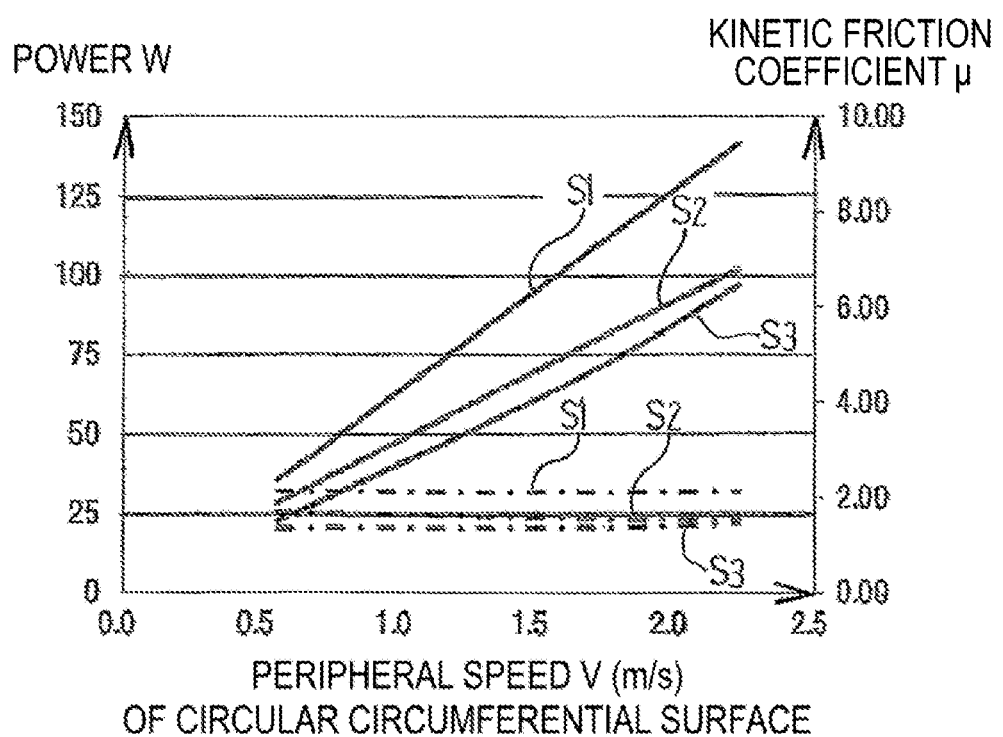
FIG. 7 is a graph illustrating a relation of a peripheral speed of a circular circumferential surface and power of a drive motor and a kinetic friction coefficient of a test sample.

In FIG. 7, as for the respective test samples S1, S2, and S3, a relation of the peripheral speed V and the power W is illustrated in solid lines, and a relation of the peripheral speed V and the kinetic friction coefficient μ is illustrated in dot-dash lines. Wear characteristics can be determined for each type of rubber based on the data in FIG. 7.

Figure 8:
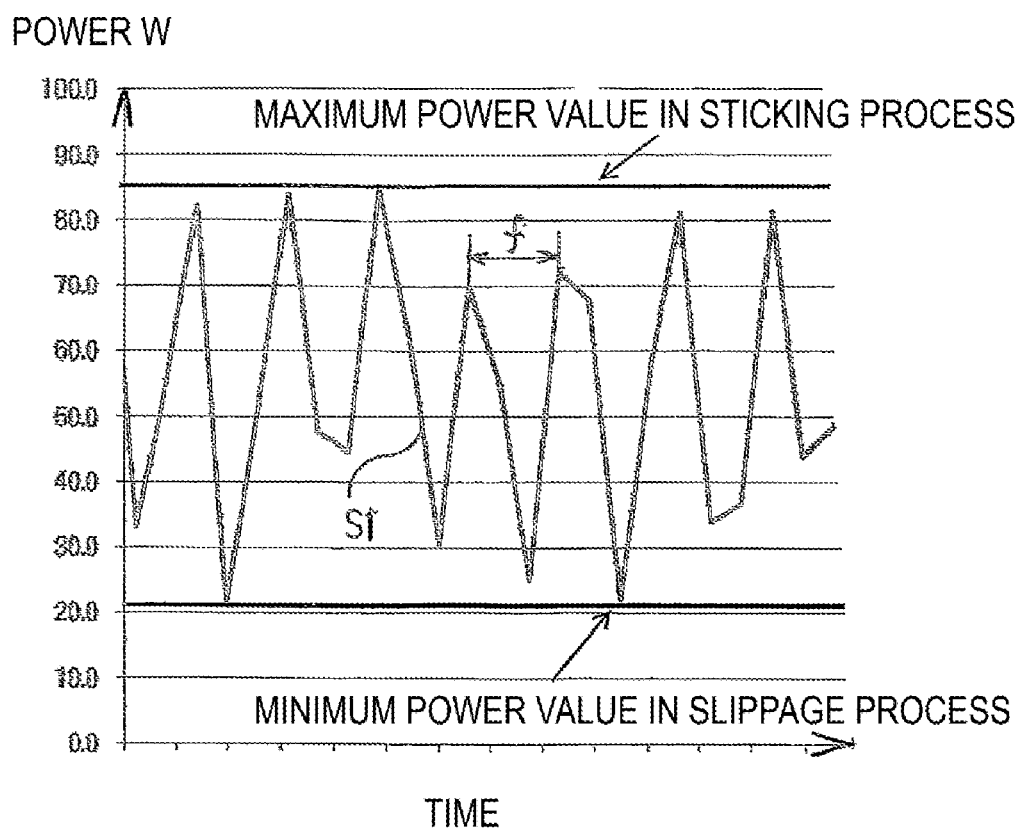
FIG. 8 is a graph illustrating fluctuation in power of a drive motor.

A generation cycle f of the stick-slip phenomenon that occurs in the test sample S can be calculated based on fluctuation in the power W during the wear test. In FIG. 8, change over time in the power W measured by the dynamometer 6a during the wear test of the test sample S1 is illustrated. It is conceivable that the power W in the slippage process of the stick-slip phenomenon is relatively increased, and the power W in the slippage process of the stick-slip phenomenon is relatively reduced. Thus, intervals between respective adjacent peaks in data correspond to the generation cycle f. The peripheral speed V is known in the wear test, and thus the predetermined pitches P in which the wear streaks L illustrated in FIG. 3 are formed can be calculated as "P=peripheral speed V/generation cycle f".

The generation cycle f (predetermined pitch P) differs, depending on the type of rubber. In addition, a difference in the generation cycle f (predetermined pitch P) causes a difference in wear mode, which serves as one index for evaluating the rubber wear resistance.

In the testing device 1, the behavior of the test sample S in the stick-slip phenomenon can be verified by taking a photograph of the movement of the test sample S with the camera 6c. The generation cycle f of the stick-slip phenomenon, for example, is approximately 0.01 to 0.03 seconds. Thus, a high-speed camera 6c that can shoot 100 frames or more per second is favorably used.

Further, an amount of deformation in the pressing direction of the test sample S can be determined by the shooting data of the camera 6c. Thus, a relation of the amount of deformation of the test sample S and the additional force F and a relation of the amount of deformation and the frictional force Ff can be determined.

As an evaluation based on the temperature T of the test sample S during the wear test, for example, thermal energy E3 in a case where the test sample S is worn is calculated based on the temperature T detected by the temperature sensor 6b. Then, wear resistance is evaluated using the magnitude of the calculated thermal energy E3.

Figure 9:
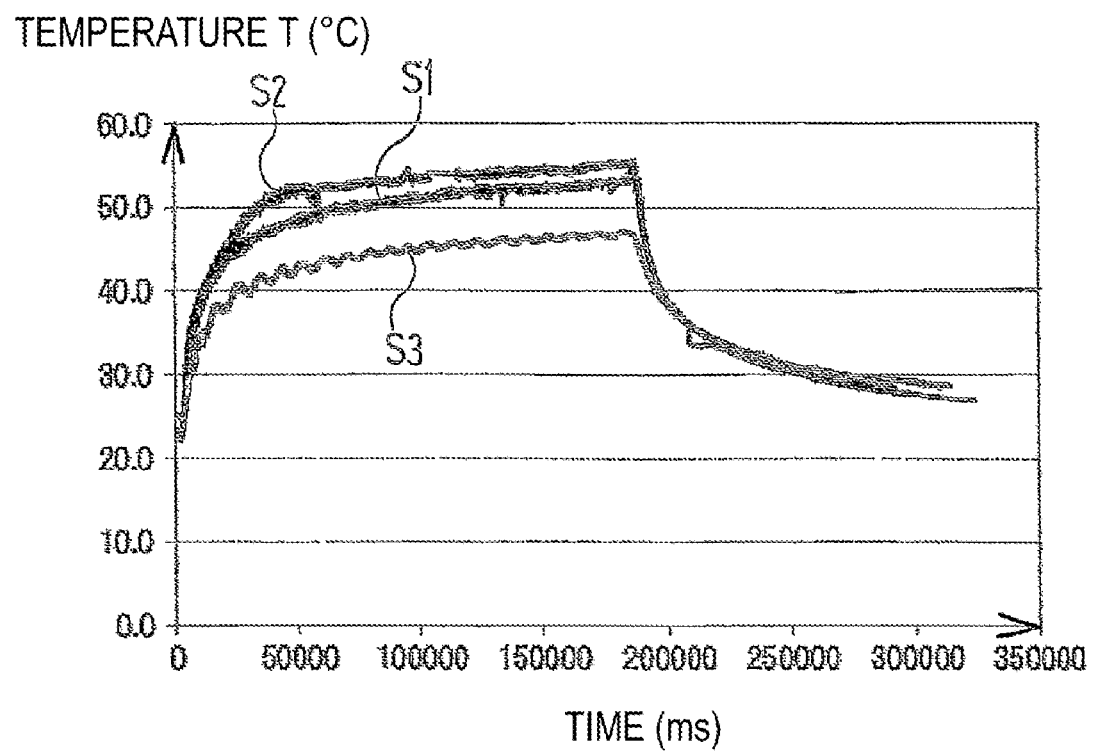
FIG. 9 is a graph illustrating a temperature change of a test sample.

FIG. 9 illustrates change over time in the temperature T in the wear test under the same condition regarding the test samples S1, S2, and S3. Assuming that a mass m of the test sample S whose temperature is increased, specific heat c, and an increased temperature ΔT are provided, the thermal energy E3 is represented as "E3=m×c×ΔT", and for example, the thermal energy E3 can be calculated by the control unit 7.

The magnitude of the thermal energy E3 differs depending on the type of rubber. Then, the temperature dependency of the wear resistance differs depending on the type of rubber, and thus it is advantageous to evaluate the wear resistance for each type of rubber with accuracy by determining the thermal energy E3 for each type of rubber. In addition, the lower the viscoelasticity of rubber prescribed by a loss factor (tan δ), a storage modulus (E'), and a loss modulus (E") is, the lower thermal energy E2 tends to be, so that a relation of the viscoelasticity of rubber and wear resistance can be determined.

As described above, in the present technology, a predetermined wear test is performed, and when the wear resistance of the test sample S is evaluated, an evaluation index based on at least one item out of the two items including the power W and the temperature T of the test sample S, in addition to the amount of wear D, is used. Therefore, the consistency of the evaluation results based on respective evaluation indices can be verified. Accordingly, it is possible to perform evaluation with high reliability without overly depending on data on the amount of wear D. The rubber wear resistance may be evaluated based on three items, which are the power W and the temperature T of the test sample S, in addition to the amount of wear D.

The invention claimed is:

1. A rubber wear resistance evaluation method, comprising:
    applying force oriented to a circular circumferential surface of a rotation body rotated by a drive motor to a test sample of rubber, thereby compressing and bonding the test sample to the circular circumferential surface at a predetermined fixed position;
    holding the test sample in a state where movement of the test sample in a direction opposite to the force is always allowed; performing a wear test in which a contact surface of the test sample with the circular circumferential surface is worn;
    evaluating wear resistance of the test sample based on at least one item out of two items including power required for driving and rotating the drive motor during the wear test and a temperature of the test sample, in addition to an amount of wear of the test sample; and
    further comprising calculating a generation cycle of a stick-slip phenomenon that occurs in the test sample based on fluctuation in the power and evaluating wear resistance of the test sample based on a magnitude of the generation cycle.

2. The rubber wear resistance evaluation method according to claim 1, further comprising evaluating wear resistance of the test sample based on a magnitude of the amount of wear and the force and a peripheral speed of the circular circumferential surface.

3. The rubber wear resistance evaluation method according to claim 1, further comprising calculating frictional force with respect to the circular circumferential surface of the test sample based on the power and evaluating wear resistance of the test sample based on a magnitude of the frictional force.

4. The rubber wear resistance evaluation method according to claim 1, further comprising calculating thermal energy in a case where the test sample is worn based on the temperature and evaluating wear resistance of the test sample based on a magnitude of the thermal energy.

5. The rubber wear resistance evaluation method according to claim 2, further comprising calculating frictional force with respect to the circular circumferential surface of the test sample based on the power and evaluating wear resistance of the test sample based on a magnitude of the frictional force.

6. The rubber wear resistance evaluation method according to claim 5, further comprising calculating thermal energy in a case where the test sample is worn based on the temperature and evaluating wear resistance of the test sample based on a magnitude of the thermal energy.

* * * * *